United States Patent
Pyen et al.

(10) Patent No.: US 12,448,516 B2
(45) Date of Patent: Oct. 21, 2025

(54) SILICONE HYDROGEL CONTACT LENSES

(71) Applicant: INTEROJO INC., Gyeonggi-do (KR)

(72) Inventors: Seunghee Pyen, Chungcheongnam-do (KR); Mirae Ra, Gyeonggi-do (KR); Hyungeun Ham, Gyeonggi-do (KR)

(73) Assignee: INTEROJO INC., Gyonggi-Do (KR)

( * ) Notice: Subject to any disclaimer, the term of this patent is extended or adjusted under 35 U.S.C. 154(b) by 591 days.

(21) Appl. No.: 17/963,461

(22) Filed: Oct. 11, 2022

(65) Prior Publication Data
US 2023/0374307 A1    Nov. 23, 2023

(30) Foreign Application Priority Data

May 20, 2022  (KR) .................. 10-2022-0062008
Jun. 29, 2022  (KR) .................. 10-2022-0079708

(51) Int. Cl.
*C08L 83/10*    (2006.01)

(52) U.S. Cl.
CPC .................. *C08L 83/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,789,507 B2* | 9/2010 | Zanini | ............... | G02B 1/043 351/159.33 |
| 10,793,659 B2* | 10/2020 | Lai | ............... | C08G 18/289 |
| 2007/0222095 A1* | 9/2007 | Zanini | ............... | B29D 11/0025 264/2.6 |
| 2007/0242219 A1* | 10/2007 | Zanini | ............... | B29D 11/00192 351/159.33 |
| 2013/0289294 A1* | 10/2013 | Awasthi | ............... | C07F 7/0838 556/419 |
| 2018/0340036 A1* | 11/2018 | Lai | ............... | C08F 290/068 |
| 2018/0355112 A1* | 12/2018 | Zhang | ............... | C08G 77/14 |
| 2019/0055427 A1* | 2/2019 | Qiu | ............... | G02B 1/043 |
| 2020/0339836 A1* | 10/2020 | Qiu | ............... | C08J 5/00 |
| 2020/0377639 A1* | 12/2020 | Lai | ............... | C08G 18/289 |

FOREIGN PATENT DOCUMENTS

| | | |
|---|---|---|
| CN | 112812307 A | 5/2021 |
| KR | 10-2012-0002609 A | 1/2012 |
| WO | WO-2014/033442 A1 | 3/2014 |
| WO | WO-2014/143926 A1 | 9/2014 |
| WO | WO-2017/103793 A1 | 6/2017 |

OTHER PUBLICATIONS

International Search Report from corresponding PCT Application No. PCT/KR2022/016455, dated Feb. 20, 2023.

* cited by examiner

*Primary Examiner* — Peter A Salamon
(74) *Attorney, Agent, or Firm* — Harness, Dickey & Pierce, P.L.C.

(57) ABSTRACT

Provided is a silicone hydrogel contact lens including a polymer composition prepared by polymerization of a composition for forming a silicone hydrogel contact lens comprising: about 10 to about 40 weight % of a silicon-containing macromer, about 1 to about 20 weight % of polyethylene glycol having a molecular weight of about 200 to about 1,000 g/mol, and a crosslinking agent or an initiator, wherein the polymerization is carried out by thermal polymerization at a temperature of about 100° C. to about 110° C. or UV photopolymerization in a manner that at least about 95% of polyethylene glycol is removed from the polymer composition.

18 Claims, No Drawings

SILICONE HYDROGEL CONTACT LENSES

CROSS-REFERENCE TO RELATED APPLICATION

This application claims priority to and the benefit of Korean Patent Application Nos. 10-2022-0062008, filed on May 22, 2022, and Korean Patent Application No. 10-2022-0079708, filed on Jun. 29, 2022, in the Korean Intellectual Property Office, the disclosure of which is incorporated herein in its entirety by reference.

FIELD

The present disclosure relates to a composition for forming a silicone hydrogel contact lens and a silicone hydrogel contact lens made from the composition, and a method to prepare the composition or the silicone hydrogel contact lens.

BACKGROUND

Contact lenses have been widely used for cosmetic purposes in addition to, or separately from vision correction, and the market for cosmetic contact lens continues to grow. Research efforts have been made to develop new cosmetic contact lens, which results in new products with different physical characteristics.

U.S. Pat. No. 7,789,507 to Zanini et al. describes an ophthalmic lens formed from a reaction mixture comprising: a high molecular weight hydrophilic polymer; an effective amount of a hydroxyl-functionalized silicone-containing monomer; and an amount of polyethylene glycol effective to facilitate release of the lens from a mold part in which the device is formed, wherein the polyethylene glycol comprises one or more of: PEG 2000, mPEG and PEG DME.

SUMMARY

In an embodiment, there is provided a composition for manufacturing a silicone hydrogel contact lens that exhibits high oxygen permeability and high water content.

In another embodiment, there is provided a silicone hydrogel contact lens that exhibits high oxygen permeability and high water content.

In yet another embodiment, there is provided a process to prepare a composition for manufacturing a silicone hydrogel contact lens and a composition described herein.

In an embodiment, a silicone hydrogel contact lens comprises a polymer composition prepared by polymerization of a composition for forming a silicone hydrogel contact lens comprising: about 10 to about 40 weight % of a silicon-containing macromer, about 1 to about 20 weight % of polyethylene glycol having a molecular weight of about 200 to about 1,000 g/mol, and a crosslinking agent or an initiator, wherein the polymerization is carried out by thermal polymerization at a temperature of about 100° C. to about 110° C. or UV photopolymerization in a manner that at least about 95% of polyethylene glycol is removed from the polymer composition.

In an embodiment, a contact lens polymer composition which is prepared by polymerization of a composition for forming a silicone hydrogel contact lens comprising: about 10 to about 40 weight % of a silicon-containing macromer, about 1 to about 20 weight % of polyethylene glycol having a molecular weight of about 200 to about 1,000 g/mol, and a crosslinking agent or an initiator, wherein the polymerization is carried out by thermal polymerization at a temperature of about 100° C. to about 110° C. or UV photopolymerization in a manner that at least about 95% of polyethylene glycol is removed from the polymer composition.

In an embodiment, a method of preparing a polymer composition comprises polymerizing a composition for forming a silicone hydrogel contact lens comprising about 10 to about 40 weight % of a silicon-containing macromer, about 1 to about 20 weight % of polyethylene glycol having a molecular weight of about 200 to about 1,000 g/mol, and a crosslinking agent or an initiator, wherein the polymerization is carried out by thermal polymerization at a temperature of about 100° C. to about 110° C. or UV photopolymerization in a manner that at least about 95% of polyethylene glycol is removed from the polymer composition.

The present disclosure are not limited to the above-mentioned embodiments and includes other unmentioned objectives and advantages. The present disclosure will be more clearly understood by the embodiments of the present disclosure.

Additional aspects will be set forth in part in the description which follows and, in part, will be apparent from the description, or may be learned by practice of the presented embodiments.

DETAILED DESCRIPTION

Hereinafter, embodiments of the present disclosure will be described in detail in such a manner that the disclosure may be easily carried out by one of ordinary skill in the art to which the present disclosure pertains. The present disclosure may be embodied in many different forms and should not be construed as being limited to the embodiments set forth herein.

The cornea receives oxygen upon contact with oxygen dissolved in tears and oxygen in the air, and contact lenses located on the cornea can be a barrier to the delivery of oxygen. Thus, oxygen permeability of a contact lens is an important consideration in developing new contact lenses especially for improvement of eye health.

In addition, in the case of contact lens materials, a composition containing a mixture of a plurality of monomers and an initiator is injected into a mold and then polymerized while a crosslinking reaction occurs by instantaneous energy. A polymer material produced from the polymerization reaction plays a role in the lens, and the properties of the contact lens, such as refractive index, mechanical strength, wettability, and oxygen permeability, are determined depending on the ingredients of the composition.

Definition

The term "hydrogel" as used herein refers to a crosslinked polymeric material which can hold at least 10 wt % or more of water in the matrix of a crosslinked polymer when hydrated.

The term "silicon-containing macromer" as used herein refers to a macromer having a weight average molecular weight of 500 Da or more, as being a monomer containing a silicon and having an ethylenically unsaturated group.

As used in the present specification, polyethylene glycol is represented by the formula $H-(O-CH_2-CH_2)_n-OH$ wherein, in general, n has a value of 4 or more.

The term "hydrophilic monomer" as used herein refers to a monomer which has a polymerizable functional group, such as an olefin or acryl group, and a hydrophilic functional group, such as hydroxyl, amine, or pyrrolidone, and has a molecular weight of less than 500 Da.

The term "silicon-containing monomer" as used herein refers to a monomer having a weight average molecular weight of less than 500 Da, as being a monomer containing a silicon and having an ethylenically unsaturated group.

A silicone hydrogel contact lens and a polymer composition

The present disclosure provides a silicone hydrogel contact lens comprising a polymer composition prepared by polymerization of a composition for forming a silicone hydrogel contact lens comprising: about 10 to about 40 weight % of a silicon-containing macromer, about 1 to about 20 weight % of polyethylene glycol having a molecular weight of about 200 to about 1,000 g/mol, and a crosslinking agent or an initiator, wherein the polymerization is carried out by thermal polymerization at a temperature of about 100° C. to about 110° C. or UV photopolymerization in a manner that at least about 95% of polyethylene glycol is removed from the polymer composition.

The polyethylene glycol in a composition for forming a silicone hydrogel contact lens can be any PEG having a molecular weight of about 200 to about 1,000 g/mol. It is undesirable to use polyethylene glycol of a high molecular weight, e.g., 2,000 to 6,000 g/mol for preparation of the silicone hydrogel contact lens. Such high molecular weight PEG is not removed enough from the composition during polymerization, and the resulting polymer fails to achieve desired characteristics such as high oxygen permeability and high water content. In an embodiment, the polyethylene glycol is selected from the group consisting of PEG 200, PEG 300, PEG 400, PEG 600, PEG 800, and PEG 1000. In a particular embodiment, the polyethylene glycol is PEG 200, PEG 400, or PEG 1000.

The polymer composition is prepared by polymerization of a composition for forming a silicone hydrogel contact lens. In an embodiment, the polymerization is carried out by thermal polymerization at a temperature of about 100° C. to about 110° C. In another embodiment, the polymerization is carried out by UV photopolymerization.

In various embodiments, the polymerization step is carried out in a manner that at least about 95% of polyethylene glycol is removed from the polymer composition. Here, the removal % of polyethylene glycol is measured based on the initial amount of polyethylene glycol included in a composition before polymerization; in other words, the PEG removal %=100−the remaining amount of PEG after polymerization/the amount of PEG before polymerization×100%. In some embodiment, the polymerization is carried out so as to remove about 95%, 96%, or 97% of polyethylene glycol from the composition.

In some embodiments, the silicone hydrogel contact lens has a water content of about 40% to about 65%. In various embodiments, the silicone hydrogel contact lens has a water content of about 40%, about 45%, about 50%, about 55%, about 60%, or about 65%.

In some embodiments, the silicone hydrogel contact lens has an oxygen permeability (Dk) of about 70 to about 120. In various embodiments, the silicone hydrogel contact lens has an oxygen permeability (Dk) of about 70, about 75, about 80, about 85, about 90, about 95, about 100, about 105, about 110, about 115, or about 120.

In some embodiments, the composition for forming a silicone hydrogel contact lens comprises:
about 10 to about 40 weight % of the silicon-containing macromer,
about 1 to about 20 weight % of the polyethylene glycol, about 10 to about 50 weight % of a hydrophilic monomer, about 10 to about 20 weight % of a silicon-containing monomer, and
a crosslinking agent or an initiator.

The silicone hydrogel contact lens described herein has various improved properties which include improvements on both oxygen permeability and water content.

The morphology of a silicone hydrogel contact lens, which can be determined by adjusting the compatibility between monomers, may affect the physical properties of a silicone hydrogel contact lens, while being helpful in production efficiency and quality stabilization. The compatibility between monomers can be calculated by a thermodynamic energy difference, such as Flory-huggins. For more accurate calculation, the compatibility may be calculated using three factors: dispersion; polarity; and hydrogen bonding, which may further increase the accuracy of the compatibility calculation. Thus, Hansen solubility parameters have been used as a tool for predicting the compatibility.

A polymer containing silicon is known to have high oxygen permeability, and a contact lens made from a silicone material generally has high oxygen permeability. However, such contact lens typically has a low water content due to the hydrophobic properties of the polymer material. When the amount of the hydrophilic monomer in the polymer is increased to increase the water content, the oxygen permeability is lowered again. As such, conventional contact lenses using a silicone material exhibits a trade-off relationship between oxygen permeability and water content. In other words, it is difficult to make contact lenses which satisfy both high oxygen permeability and high water content.

The silicone hydrogel contact lens of the present disclosure is prepared by polymerizing a silicon-containing macromer yet still shows both satisfactory oxygen permeability and water content.

In an embodiment, a composition for forming a silicone hydrogel contact lens includes a silicon-containing macromer and polyethylene glycol, wherein differences $\Delta\delta D$, $\Delta\delta P$, and $\Delta\delta H$ in dispersion force ($\delta D$), dipolar attraction ($\delta P$), and hydrogen bonding force ($\delta H$), which determine Hansen solubility parameters, between the Hansen solubility parameters of the silicon-containing macromer and the polyethylene glycol satisfy the following conditions:

$$-6.0\ \text{MPa}^{1/2} \leq \Delta\delta D \leq 1.0\ \text{MPa}^{1/2};$$

$$1.5\ \text{MPa}^{1/2} \leq \Delta\delta P \leq 3.5\ \text{MPa}^{1/2};\ \text{and}$$

$$4.0\ \text{MPa}^{1/2} \leq \Delta\delta H \leq 8.0\ \text{MPa}^{1/2}.$$

A silicone hydrogel contact lens according to an embodiment of the present disclosure includes a polymer obtained by polymerizing a composition for forming a silicone hydrogel contact lens, the composition including a silicon-containing macromer and polyethylene glycol, wherein differences $\Delta\delta D$, $\Delta\delta P$, and $\Delta\delta H$ in dispersion force ($\delta D$), dipolar attraction ($\delta P$), and hydrogen bonding force ($\delta H$), which determine Hansen solubility parameters, between the Hansen solubility parameters of the silicon-containing macromer and the polyethylene glycol satisfy the following conditions:

$$-6.0\ \text{MPa}^{1/2} \leq \Delta\delta D \leq 1.0\ \text{MPa}^{1/2};$$

$$1.5\ \text{MPa}^{1/2} \leq \Delta\delta P \leq 3.5\ \text{MPa}^{1/2};\ \text{and}$$

$$4.0\ \text{MPa}^{1/2} \leq \Delta\delta H \leq 8.0\ \text{MPa}^{1/2}.$$

The polyethylene glycol is used as a processing aid during polymerization of the silicone hydrogel contact lens, and thus plays roles such as dispersing, viscosifying and highly hardening depending on the types of materials for forming a polymer. In addition, the polyethylene glycol may greatly affect the properties of the polymer formed in accordance with the composition ratio of the composition. The gyration radius and the size of a polyethylene glycol, which is non-reactive, vary depending on the compatibilities with other ingredients in the composition from the beginning of a reaction, and accordingly, the compatibilities between the polyethylene glycol and the polymers may alter. Subsequently, the non-reactive polyethylene glycol escapes through a hydration process, and a structure formed to have specific size and molecular arrangement remains by the gyration radius. The structure formed by the gyration radius affects the physical properties of the contact lens.

Accordingly, in the composition for forming a silicone hydrogel contact lens, by controlling the solubility of the silicon-containing macromer with respect to the polyethylene glycol, the polyethylene glycol is involved in controlling the physical properties of a hydrogel. As a result, the silicone hydrogel contact lens can achieve high oxygen permeability and high water content. The solubility of the silicon-containing macromer with respect to the polyethylene glycol is controlled so that three controlling factors for determining Hansen solubility parameters, i.e., dispersion force ($\delta D$), dipolar attraction ($\delta P$), and hydrogen bonding force ($\delta H$), satisfy the above-described ranges.

Specifically, the polyethylene glycol undergoes phase separation as the compatibility thereof with a polymer formed in the polymerization process of the composition for forming a silicone hydrogel contact lens is lowered, and after the polymerization reaction is completed, the polyethylene glycol is isolated in a hydration process to form voids in chains of the polymer, and these voids are filled with water, thus achieving high water content.

By making the solubility between the silicon-containing macromer and the polyethylene glycol satisfy the Hansen solubility parameter conditions, the polyethylene glycol serves to provide a hydration site that determines water content.

As such, given that the present silicone hydrogel contact lens is made from a silicon-containing macromer-based polymer, the silicone hydrogel contact lens has high oxygen permeability. In addition, as described above, polyethylene glycol is used in polymerization so as to increase water content, the silicone hydrogel contact lens can achieve both high oxygen permeability and high water content.

Hansen solubility parameters (HSPs) consist of three parameters that represent forces acting between molecules of a substance (dispersion force ($\delta D$), dipolar attraction ($\delta P$), and hydrogen bonding force ($\delta H$)), and can be calculated according to the approach proposed by Charles Hansen in the work with the title "Hansen Solubility Parameters: A User's Handbook," Second Edition (2007) Boca Raton, Fla.: CRC Press. ISBN 978-O-8493-7248-3.

The dispersion force ($\delta D$) quantifies the energy of the forces of dispersion between molecules, i.e., the van der Waals force, the dipolar attraction ($\delta P$) represents the energy of the intermolecular dipolar interactions, and the hydrogen bonding force ($\delta H$) quantifies the energy derived from the intermolecular hydrogen bonds, i.e., the capacity to interact via a hydrogen bond.

The Hansen solubility parameters (HSPs) are a vector quantity expressed as ($\delta D$, $\delta P$, $\delta H$), and are expressed by plotting in a three-dimensional space (Hansen space) with coordinate axes representing three parameters. Since there is a known information source such as a database for the Hansen solubility parameters (HSPs) of a commonly used material, for example, the Hansen solubility parameters (HSPs) of a desired material may be obtained with reference to the database. For materials whose Hansen solubility parameters (HSPs) are not registered in the database, the Hansen solubility parameters (HSPs) may be calculated from the chemical structures of substances or the Hansen solubility method by using a computer program software such as Hansen Solubility Parameters in Practice (HSPiP). Specifically, the Hansen solubility parameters of the silicon-containing macromer may be calculated in accordance with the Y-BM Group Contribution method, and in the same manner, the solubility parameters of other components of the composition for forming a silicone hydrogel contact lens, e.g., other monomolecules such as polyethylene glycol, a polymer, or the like, may be calculated and used.

To control the solubility of the silicon-containing macromer with respect to the polyethylene glycol, i.e., to make three parameters for determining Hansen solubility parameters, i.e., dispersion force ($\delta D$), dipolar attraction ($\delta P$), and hydrogen bonding force ($\delta H$), satisfy the following conditions: $-6.0\ \text{MPa}^{1/2} \leq \Delta\delta D \leq 1.0\ \text{MPa}^{1/2}$; $1.5\ \text{MPa}^{1/2} \leq \Delta\delta P \leq 3.5\ \text{MPa}^{1/2}$; and $4.0\ \text{MPa}^{1/2} \Delta\delta H \leq 8.0\ \text{MPa}^{1/2}$ variables that affect values of the dispersion force ($\delta D$), the dipolar attraction ($\delta P$), and the hydrogen bonding force ($\delta H$) may be controlled. For example, variables, such as formulation of components of the composition for forming a silicone hydrogel contact lens and the amount of each component, the structure and the molecular weight of the silicon-containing macromer, and the molecular weight and the content of the polyethylene glycol, etc. may complexly affect the above conditions. Therefore, the composition for forming a silicone hydrogel contact lens may be designed to satisfy the above conditions by controlling these as variables.

In a silicone hydrogel contact lens according to another embodiment of the present invention, differences $\Delta\delta D$, $\Delta\delta P$, and $\Delta\delta H$ in dispersion force ($\delta D$), dipolar attraction ($\delta P$), and hydrogen bonding force ($\delta H$), which determine Hansen solubility parameters, between the Hansen solubility parameters of the silicon-containing macromer and the polyethylene glycol may satisfy the following ranges:

$-0.8\ \text{MPa}^{1/2} \leq \Delta\delta D \leq 0.3\ \text{MPa}^{1/2}$;

$2.0\ \text{MPa}^{1/2} \leq \Delta\delta P \leq 2.5\ \text{MPa}^{1/2}$; and $4.5\ \text{MPa}^{1/2} \leq \Delta\delta H \leq 5.7\ \text{MPa}^{1/2}$.

In one embodiment, the silicon-containing macromer includes at least a plurality of siloxane repeating units [—Si—O—], and includes one or two acrylic functional groups.

In one embodiment, the weight average molecular weight of the silicon-containing macromer may range from about 500 Da to about 2,500 Da.

Specific examples of the silicon-containing macromer include, but are not limited to, methacryloxypropyltris(trimethylsiloxy)silane, monomethacryloxyalkyl terminated polydimethylsiloxane, 3-{alpha-(trimethylsilyl)poly[oxy (dimethylsilylene)]}propyl 2-methylprop-2-enoate, monobutyl terminated polydimethylsiloxane, methacrylooxypropyl terminated polydimethylsiloxane, mono vinyl terminated polydimethylsiloxane, bis(divinyl) terminated polydimethylsiloxane, alpha-monovinyl-monophenyl-Ω-monohydride terminated polymethylsiloxane, and the silicon-containing macromer may include at least one of these materials.

In one embodiment, the silicon-containing macromer may include at least one selected from a compound represented by Formula 1 below, a compound represented by Formula 2 below, a compound represented by Formula 3 below, a compound represented by Formula 4 below, and a combination thereof.

<Formula 1>

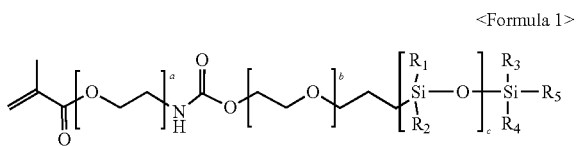

wherein, in Formula 1,
a is an integer of 1 to 30, b is an integer of 1 to 30, and c is an integer of 5 to 30,
$R_1$ to $R_4$ are, each independently, hydrogen or C1-C6 alkyl, and
$R_5$ is C1-C8 alkyl, tri(C1-C8)alkylsiloxy, phenyl, naphthyl, substituted C1-C8 alkyl, substituted phenyl, or substituted naphthyl, wherein a substituent of the alkyl is at least one selected from C1-C8 alkoxycarbonyl, C1-C8 alkyl, C1-C8 alkoxy, amide, halogen, hydroxyl, carboxyl, C1-C8 alkylcarbonyl, and formyl, and substituents of the phenyl and the naphthyl are each at least one selected from C1-C8 alkoxycarbonyl, C1-C8 alkyl, C1-C8 alkoxy, amide, halogen, hydroxyl, carboxyl, C1-C8 alkylcarbonyl, and formyl.

$R_3$ and $R_4$ are each independently hydrogen, C1-C6 alkyl, tri(C1-C6)alkylsiloxy, phenyl, naphthyl, substituted C1-C6 alkyl, substituted phenyl, or substituted naphthyl, wherein a substituent of the alkyl is at least one selected from C1-C6 alkoxycarbonyl, C1-C6 alkyl, C1-C6 alkoxy, amide, halogen, hydroxyl, carboxyl, C1-C6 alkylcarbonyl, and formyl, and substituents of the phenyl and the naphthyl are each at least one selected from C1-C6 alkoxycarbonyl, C1-C6 alkyl, C1-C6 alkoxy, amide, halogen, hydroxyl, carboxyl, C1-C6 alkylcarbonyl, and formyl.

<Formula 4>

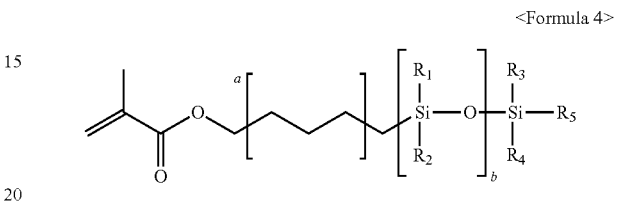

wherein, in Formula 4,
a is an integer of 1 to 8, and b is an integer of 3 to 10,
$R_1$ to $R_4$ are each independently hydrogen or C1-C6 alkyl, and
$R_5$ is C1-C8 alkyl, tri(C1-C8)alkylsiloxy, phenyl, naphthyl, substituted C1-C8 alkyl, substituted phenyl, or substituted naphthyl, wherein a substituent of the alkyl is at least one selected from C1-C8 alkoxycarbonyl, C1-C8 alkyl, <Formula 2>

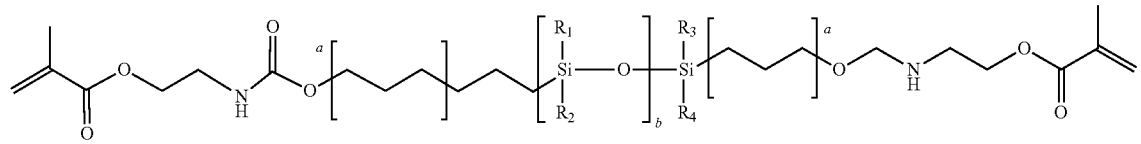

wherein, in Formula 2,
a is an integer of 1 to 27, and b is an integer of 3 to 27,
$R_1$ and $R_2$ are each independently hydrogen or C1-C8 alkyl, and
$R_3$ and $R_4$ are each independently hydrogen, C1-C6 alkyl, tri(C1-C6)alkylsiloxy, phenyl, naphthyl, substituted C1-C6 alkyl, substituted phenyl, or substituted naphthyl, wherein a substituent of the alkyl is at least one selected from C1-C6 alkoxycarbonyl, C1-C6 alkyl, C1-C6 alkoxy, amide, halogen, hydroxyl, carboxyl, C1-C6 alkylcarbonyl, and formyl, and substituents of the phenyl and the naphthyl are each at least one selected from C1-C6 alkoxycarbonyl, C1-C6 alkyl, C1-C6 alkoxy, amide, halogen, hydroxyl, carboxyl, C1-C6 alkylcarbonyl, and formyl.

C1-C8 alkoxy, amide, halogen, hydroxyl, carboxyl, C1-C8 alkylcarbonyl, and formyl, and substituents of the phenyl and the naphthyl are each at least one selected from C1-C8 alkoxycarbonyl, C1-C8 alkyl, C1-C8 alkoxy, amide, halogen, hydroxyl, carboxyl, C1-C8 alkylcarbonyl, and formyl.

The type and the content of the silicon-containing macromer may be freely determined within the limits that satisfy the Hansen solubility parameter conditions with respect to the polyethylene glycol.

The composition for forming a silicone hydrogel contact lens may include about 21 wt % to about 48 wt % of the silicon-containing macromer.

In one embodiment, the weight average molecular weight of the polyethylene glycol may range from about 200 g/mol to about 1,000 g/mol.

The content of the polyethylene glycol may vary depending on the relationship with the silicon-containing macromer to satisfy the Hansen solubility parameter conditions with respect to the macromer. For example, the composition for forming a silicone hydrogel contact lens may include about 4 parts by weight to about 96 parts by weight of the polyethylene glycol with respect to 100 parts by weight of the silicon-containing macromer.

The type, the molecular weight, the content, and the like of the polyethylene glycol may be freely determined within the limits that satisfy the Hansen solubility parameter conditions with respect to the silicon-containing macromer.

<Formula 3>

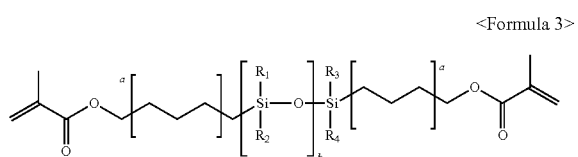

wherein, in Formula 3,
a is an integer of 1 to 27, and b is an integer of 3 to 27,
$R_1$ and $R_2$ are each independently hydrogen or C1-C8 alkyl, and The physical properties of the final product, i.e., a contact lens, are determined depending on how the composition of each component of the composition for forming a silicone hydrogel contact lens is designed. In designing physical properties of a contact lens, it is required to consider three main factors, i.e., water content; oxygen permeability; and durability, although there may be other useful factors. In this regard, in the case of durability, strength, elongation, and Young's modulus may be distinguished. In consideration of the physical properties of such contact lenses, the composition for forming a silicone hydrogel contact lens may further include other components in addition to a silicon-containing macromer and polyethylene glycol as long as the composition satisfies the pre-determined Hansen solubility parameter conditions.

In one embodiment, the composition for forming a silicone hydrogel contact lens may further include a hydrophilic monomer.

The hydrophilic monomer participates in radical polymerization of the composition for forming a silicone hydrogel contact lens, and the structural unit based on the hydrophilic monomer is included in the polymer. The silicon-containing macromer and the hydrophilic monomer are polymerized through a polymerization reaction by a radical reaction initiated by heat or light to form a polymer.

The hydrophilic monomer may be, but is not limited to, for example, N,N-dimethylacrylamide, 2-hydroxyethyl methacrylate, glycerol monomethacrylate, 2-hydroxyethyl methacrylamide, polyethylene glycol monomethacrylate, methacrylic acid, acrylic acid, N-vinyl pyrrolidone, N-vinyl-N-methyl acetamide, N-vinyl-N-ethyl acetamide, N-vinyl-N-ethyl formamide, and N-vinyl formamide, and may include at least one of these materials.

In one embodiment, the composition for forming a silicone hydrogel contact lens may include about 20 parts by weight to about 239 parts by weight of the hydrophilic monomer with respect to 100 parts by weight of the silicon-containing macromer. The composition for forming a silicone hydrogel contact lens may realize a contact lens having high water content while including the hydrophilic monomer in not a relatively large amount within the above range, compared to commercially available contact lenses.

In one embodiment, the composition for forming a silicone hydrogel contact lens may further include a silicon-containing monomer and a crosslinking agent.

In one embodiment, the silicon-containing monomer includes at least a plurality of siloxane repeating units [—Si—O—], and includes one or two acrylic functional groups.

The silicon-containing monomer has a weight average molecular weight of less than 500 Da, is not a macromer, and is different from the silicon-containing macromer.

The silicon-containing monomer may be, but is not limited to, for example, $\alpha,\omega$-bismethacryloxypropylpolydimethylsiloxane (SiGMA), 3-methacryloxypropyl tris(trimethylsiloxy)silane (TRIS), monomethacryloxypropyl terminated polydimethylsiloxane, polydimethylsiloxane, 3-methacryloxypropyl bis(trimethylsiloxy)methylsilane, and methacryloxypropyl pentamethyl disiloxane, and may include at least one of these materials.

In one embodiment, the composition for forming a silicone hydrogel contact lens may include about 23 parts by weight to about 143 parts by weight with respect to 100 parts by weight of the silicon-containing macromer.

In one embodiment, the composition for forming a silicone hydrogel contact lens may further include a crosslinking agent.

The crosslinking agent may be, but is not limited to, for example, allyl methacrylate (AMA), divinylbenzene (DVB), triethylene glycol dimethacrylate (TrEGDMA), triallyl isocyanurate (TAIC), ethylene glycol dimethyl acrylate (EGDMA), ethylenediamine dimethacrylamide, and glycerol dimethacrylate, and may include at least one of these materials.

In one embodiment, the composition for forming a silicone hydrogel contact lens may include about 1 part by weight to about 38 parts by weight of the crosslinking agent with respect to 100 parts by weight of the silicon-containing macromer.

In one embodiment, the composition for forming a silicone hydrogel contact lens may further include an initiator. The initiator may be a thermal initiator or a photoinitiator that initiates a radical reaction by heat or light such as infrared rays or ultraviolet rays.

The initiator may include, for example, a compound such as lauryl peroxide, benzoyl peroxide, isopropyl percarbonate, or azobisisobutyronitrile, or a photoinitiator such as aromatic alpha-hydroxy ketone, alkoxyoxybenzoin, acetophenone, tert-butyl peroxineadecanoate, acyl phosphine oxide, tertiary amine, diketone, or a mixture thereof. Examples of the photoinitiator may include 1-hydroxycyclohexyl phenyl ketone, 2-hydroxy-2-methyl-1-phenyl-propane-1-one, bis(2,6-dimethoxybenzoyl)-2,4,4-trimethylpentyl phosphine oxide (DMBAPO), bis(2,4,6-trimethylbenzoyl)-phenylphosphine oxide (Irgacure 819), 2,4,6-trimethylbenzyldiphenyl phosphine oxide, 2,4,6-trimethylbenzoyl diphenylphosphine oxide, benzoin methyl ester, camphorquinone, and ethyl 4-(N,N-dimethylamino) benzoate, and the photoinitiator may be used alone or a combination of these materials may be used. Examples of commercially available visible light photoinitiators may include, but are not limited to, Irgacure 819, Irgacure 1700, Irgacure 1800, Irgacure 819, Irgacure 1850 (manufacturer: Ciba Specialty Chemicals), and a Lucirin TPO initiator, and may include at least one of these materials.

In one embodiment, the composition for forming a silicone hydrogel contact lens may include about 1 part by weight to about 38 parts by weight of the initiator with respect to 100 parts by weight of the silicon-containing macromer.

In one embodiment, the composition for forming a silicone hydrogel contact lens may further include substances known as additives that may be added to a composition for manufacturing a contact lens, such as a UV blocker, a pigment, an antioxidant, a plasticizer, a wetting agent, a lubricant, a viscosity-reducing agent, and a compatibility enhancing agent.

The composition for forming a silicone hydrogel contact lens may be used to manufacture a silicone hydrogel contact lens by a generally known process for manufacturing a contact lens.

For example, the composition for forming a silicone hydrogel contact lens, obtained by mixing as described above in detail, is injected into a mold, a lens is formed by polymerization using heat or light such as ultraviolet rays or infrared rays, and then the dried lens is separated from the mold and subjected to a hydration process, thereby completing the manufacture of a silicone hydrogel contact lens.

The silicone hydrogel contact lens manufactured using the composition for forming a silicone hydrogel contact lens, as described above in detail exhibits physical properties that simultaneously satisfy high oxygen permeability and high water content.

In one embodiment, the silicone hydrogel contact lens has a water content of about 50% to about 60% and an oxygen permeability (Dk) of about 80 to about 120.

As described above, it is necessary to properly formulate a composition for forming a silicone hydrogel contact lens to achieve the desired physical properties of the contact lens to be manufactured. As a result, it is possible to obtain a silicone hydrogel contact lens with desired durability such as strength, elongation, and Young's modulus, as well as improved water content and oxygen permeability.

In one embodiment, the silicone hydrogel contact lens has a tensile strength of about 6 kgf/mm² to about 8 kgf/mm². In one embodiment, the silicone hydrogel contact lens has an elongation of about 150% to about 200%. In one embodiment, the silicone hydrogel contact lens has a tensile modulus of about 0.3 kgf/mm² to about 0.8 kgf/mm². In one embodiment, the silicone hydrogel contact lens has an oxygen permeability of about $80 \times 10^{-11}$ (cm²/s) [ml O₂/(ml·mmHg)] to about $115 \times 10^{-11}$ (cm²/s) [ml O²/(ml·mmHg)]. In one embodiment, the silicone hydrogel contact lens has a water content of about 50% to about 55%.

In some embodiments, there are provided various lens compositions prepared in accordance with the descriptions herein, and non-limiting examples of such compositions include: (1) a composition comprising about 100 parts by weight of a silicon-containing macromer of Formula 11, about 95 parts by weight of PEG 200, about 162 parts by weight of a hydrophilic monomer, about 108 parts by weight of a silicon-containing monomer, about 5 parts by weight of a crosslinking agent, and about 5 parts by weight of an initiator; (2) a composition comprising about 38 parts by weight of a silicon-containing macromer of Formula 11, about 62 parts by weight of a silicon-containing macromer of Formula 12, about 83 parts by weight of PEG 200, about 135 parts by weight of a hydrophilic monomer, about 90 parts by weight of a silicon-containing monomer, about 4 parts by weight of a crosslinking agent, and about 4 parts by weight of an initiator; (3) a composition comprising about 100 parts by weight of a silicon-containing macromer of Formula 13, about 83 parts by weight of PEG 200, about 135 parts by weight of a hydrophilic monomer, about 90 parts by weight of a silicon-containing monomer, about 4 parts by weight of a crosslinking agent, and about 4 parts by weight of an initiator; (4) a composition comprising about 97 parts by weight of a silicon-containing macromer of Formula 11, about 3 parts by weight of a silicon-containing macromer of Formula 12, about 6 parts by weight of PEG 400, about 114 parts by weight of a hydrophilic monomer, about 76 parts by weight of a silicon-containing monomer, about 4 parts by weight of a crosslinking agent, and about 4 parts by weight of an initiator; (5) a composition comprising about 3 parts by weight of a silicon-containing macromer of Formula 12, about 97 parts by weight of a silicon-containing macromer of Formula 13, about 6 parts by weight of PEG 400, about 114 parts by weight of a hydrophilic monomer, about 76 parts by weight of a silicon-containing monomer, about 4 parts by weight of a crosslinking agent, and about 4 parts by weight of an initiator; (6) a composition comprising about 100 parts by weight of a silicon-containing macromer of Formula 13, about 6 parts by weight of PEG 400, about 114 parts by weight of a hydrophilic monomer, about 76 parts by weight of a silicon-containing monomer, about 4 parts by weight of a crosslinking agent, and about 4 parts by weight of an initiator; (7) a composition comprising about 100 parts by weight of a silicon-containing macromer of Formula 14, about 28 parts by weight of PEG 400, about 87 parts by weight of a hydrophilic monomer, about 58 parts by weight of a silicon-containing monomer, about 3 parts by weight of a crosslinking agent, and about 3 parts by weight of an initiator; (8) a composition comprising about 78 parts by weight of a silicon-containing macromer of Formula 11, about 22 parts by weight of a silicon-containing macromer of Formula 15, about 28 parts by weight of PEG 400, about 87 parts by weight of a hydrophilic monomer, about 58 parts by weight of a silicon-containing monomer, about 3 parts by weight of a crosslinking agent, and about 3 parts by weight of an initiator; (9) a composition comprising about 25 parts by weight of a silicon-containing macromer of Formula 14, about 75 parts by weight of a silicon-containing macromer of Formula 16, about 95 parts by weight of PEG 400, about 162 parts by weight of a hydrophilic monomer, about 108 parts by weight of a silicon-containing monomer, about 5 parts by weight of a crosslinking agent, and about 5 parts by weight of an initiator; (10) a composition comprising about 25 parts by weight of a silicon-containing macromer of Formula 14, about 75 parts by weight of a silicon-containing macromer of Formula 17, about 83 parts by weight of PEG 1000, about 135 parts by weight of a hydrophilic monomer, about 90 parts by weight of a silicon-containing monomer, about 4 parts by weight of a crosslinking agent, and about 4 parts by weight of an initiator; (11) a composition comprising about 3 parts by weight of a silicon-containing macromer of Formula 15, about 97 parts by weight of a silicon-containing macromer of Formula 18, about 95 parts by weight of PEG 1000, about 162 parts by weight of a hydrophilic monomer, about 108 parts by weight of a silicon-containing monomer, about 5 parts by weight of a crosslinking agent, and about 5 parts by weight of an initiator; (12) a composition comprising about 97 parts by weight of a silicon-containing macromer of Formula 18, about 3 parts by weight of a silicon-containing macromer of Formula 19, about 95 parts by weight of PEG 1000, about 162 parts by weight of a hydrophilic monomer, about 108 parts by weight of a silicon-containing monomer, about 5 parts by weight of a crosslinking agent, and about 5 parts by weight of an initiator; and (13) a composition comprising about 62 parts by weight of a silicon-containing macromer of Formula 18, about 38 parts by weight of a silicon-containing macromer of Formula 20, about 95 parts by weight of PEG 1000, about 162 parts by weight of a hydrophilic monomer, about 108 parts by weight of a silicon-containing monomer, about 5 parts by weight of a crosslinking agent, and about 5 parts by weight of an initiator. In various embodiment, the hydrophilic monomer is N-vinyl-2-pyrrolidone (NVP); the crosslinking agent is tri(ethyleneglycol)dimethacrylate) (TEGDMA); the silicon-containing monomer is α,ω-bismethacryloxypropylpolydimethylsiloxane (SiGMA); and the initiator is 2,2'-azobisisobutyronitrile (AIBN).

Hereinafter, examples and comparative examples of the present disclosure will be described. The following examples are merely embodiments of the present disclosure and are not intended to limit the present disclosure.

EXAMPLE

Example 1

100 parts by weight of a compound represented by Formula 11 below (weight average molecular weight of 1,000 Da) as a silicon-containing macromer, 162 parts by weight of N-vinyl-2-pyrrolidone (NVP) as a hydrophilic monomer, 95 parts by weight of polyethylene glycol (weight average molecular weight of 200 Da), 5 parts by weight of tri(ethyleneglycol)dimethacrylate) (TEGDMA) as a crosslinking agent, α,ω-bismethacryloxypropylpolydimethylsiloxane (SiGMA) as a silicon-containing monomer, and 2,2'-azobisisobutyronitrile (AIBN) as a thermal initiator were mixed to thereby complete the preparation of a composition for forming a silicone hydrogel contact lens.

The composition for forming a silicone hydrogel contact lens was injected into a polypropylene mold and polymerized at 110° C. to manufacture a lens, and the lens was dried and then separated from the mold. The separated lens was hydrated in saline and sterilized at 120° C., thereby completing the manufacture of a silicone hydrogel contact lens.

<Formula 11>

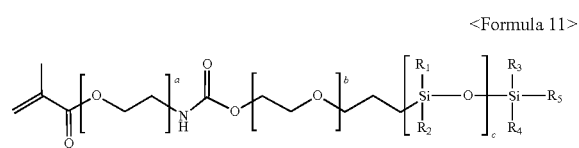

wherein, in Formula 11, $R_1$ to $R_4$ are methyl groups, $R_5$ is a butyl group, a=1, b=1, and c=15.

Example 2

The compound represented by Formula 11 and a compound represented by Formula 12 below were mixed in amounts shown in Table 1 below so that the amount of the silicon-containing macromer became 100 parts by weight, and 135 parts by weight of NVP as a hydrophilic monomer, 83 parts by weight of polyethylene glycol (weight average molecular weight of 200 Da), 4 parts by weight of TEGDMA as a crosslinking agent, SiGMA as a silicon-containing monomer, and AIBN as a thermal initiator were mixed, thereby completing the preparation of a silicone hydrogel contact lens. Subsequently, a silicone hydrogel contact lens was manufactured in the same manner as in Example 1.

<Formula 12>

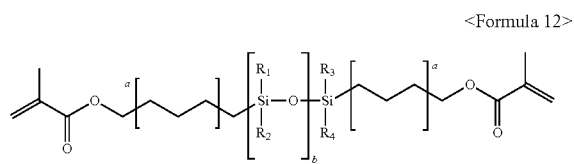

wherein, in Formula 12, $R_1$ to $R_4$ are methyl groups, a=1, and b=9.

Example 3

A compound represented by Formula 13 below was used so that the amount of the silicon-containing macromer became 100 parts by weight, and 135 parts by weight of NVP as a hydrophilic monomer, 83 parts by weight of polyethylene glycol (weight average molecular weight of 200 Da), 4 parts by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

<Formula 13>

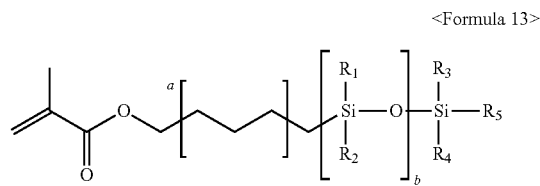

wherein, in Formula 13, $R_1$ to $R_4$ are methyl groups, $R_5$ is a butyl group, a=3, and b=6.

Example 4

The compound represented by Formula 11 and the compound represented by Formula 12 were mixed in amounts shown in Table 1 below so that the amount of the silicon-containing macromer became 100 parts by weight, and 114 parts by weight of NVP as a hydrophilic monomer, 6 parts by weight of polyethylene glycol (weight average molecular weight of 400 Da), 4 parts by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

Example 5

The compound represented by Formula 12 and the compound represented by Formula 13 were mixed in amounts shown in Table 1 below so that the amount of the silicon-containing macromer became 100 parts by weight, and 114 parts by weight of NVP as a hydrophilic monomer, 6 parts by weight of polyethylene glycol (weight average molecular weight of 400 Da), 4 parts by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

Example 6

The compound represented by Formula 13 was used so that the amount of the silicon-containing macromer became 100 parts by weight, and 114 parts by weight of NVP as a hydrophilic monomer, 6 parts by weight of polyethylene glycol (weight average molecular weight of 400 Da), 4 parts by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

Example 7

A compound represented by Formula 14 below was used so that the amount of the silicon-containing macromer became 100 parts by weight, and 87 parts by weight of NVP as a hydrophilic monomer, 28 parts by weight of polyethylene glycol (weight average molecular weight of 200 Da), 3 parts by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

<Formula 14>

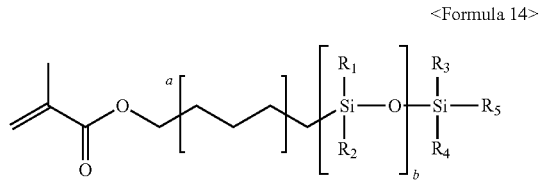

wherein, in Formula 14, $R_1$ to $R_4$ are methyl groups, $R_5$ is a butyl group substituted with hydroxyl, a=6, and b=18.

Example 8

The compound represented by Formula 11 and a compound represented by Formula 15 below were mixed in amounts shown in Table 1 below so that the amount of the silicon-containing macromer became 100 parts by weight, and 87 parts by weight of NVP as a hydrophilic monomer, 28 parts by weight of polyethylene glycol (weight average molecular weight of 400 Da), 3 parts by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

<Formula 15>

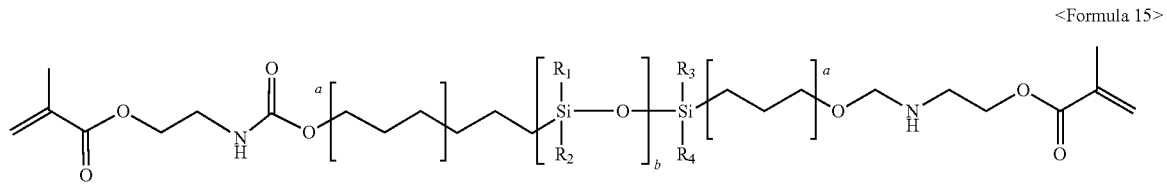

wherein, in Formula 15, $R_1$ to $R_4$ are methyl groups, a=1, and b=9.

Example 9

The compound represented by Formula 14 and a compound represented by Formula 16 below were mixed in amounts shown in Table 1 below so that the amount of the silicon-containing macromer became 100 parts by weight, and 162 parts by weight of NVP as a hydrophilic monomer, 95 parts by weight of polyethylene glycol (weight average molecular weight of 400 Da), 5 parts by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

<Formula 16>

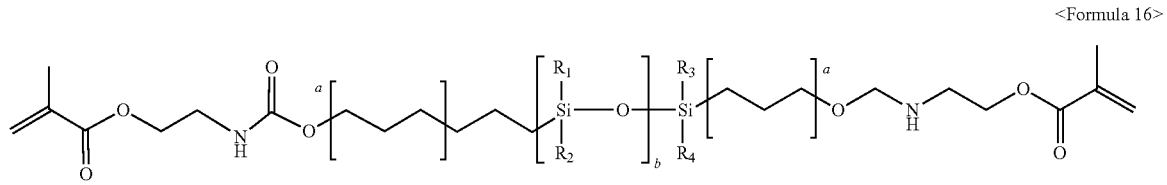

wherein, in Formula 16, $R_1$ and $R_2$ are methyl groups, $R_4$ and $R_3$ are methyl groups substituted with amine, a=3, and b=13.

Example 10

The compound represented by Formula 14 and a compound represented by Formula 17 below were mixed in amounts shown in Table 1 below so that the amount of the silicon-containing macromer became 100 parts by weight, and 135 parts by weight of NVP as a hydrophilic monomer, 83 parts by weight of polyethylene glycol (weight average molecular weight of 1000 Da), 4 parts by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

<Formula 17>

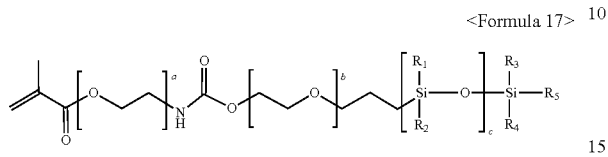

wherein, in Formula 17, $R_1$ to $R_4$ are methyl groups, $R_5$ is a hexyl group substituted with hydroxyl, a=6, b=6, and c=20.

Example 11

The compound represented by Formula 15 and a compound represented by Formula 18 below were mixed in amounts shown in Table 1 below so that the amount of the silicon-containing macromer became 100 parts by weight, and 162 parts by weight of NVP as a hydrophilic monomer, 95 parts by weight of polyethylene glycol (weight average molecular weight of 1000 Da), 5 parts by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

<Formula 18>

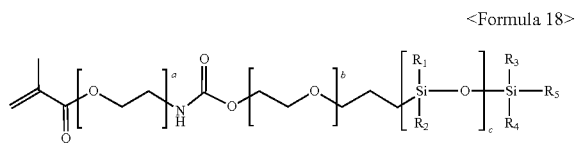

wherein, in Formula 18, $R_1$ to $R_4$ are methyl groups, $R_5$ is a hexyl group substituted with amide, a=6, b=6, and c=18.

Example 12

The compound represented by Formula 18 above and a compound represented by Formula 19 below were mixed in amounts shown in Table 1 below so that the amount of the silicon-containing macromer became 100 parts by weight, and 162 parts by weight of NVP as a hydrophilic monomer, 95 parts by weight of polyethylene glycol (weight average molecular weight of 1000 Da), 4 parts by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

<Formula 19>

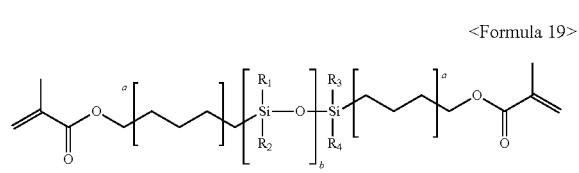

wherein, in Formula 19, $R_1$ to $R_3$ are propyl groups, $R_4$ is a methyl group substituted with hydroxyl, a=6, and b=13.

Example 13

The compound represented by Formula 18 above and a compound represented by Formula 20 below were mixed in amounts shown in Table 1 below so that the amount of the silicon-containing macromer became 100 parts by weight, and 162 parts by weight of NVP as a hydrophilic monomer, 95 parts by weight of polyethylene glycol (weight average molecular weight of 1000 Da), 4 parts by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

<Formula 20>

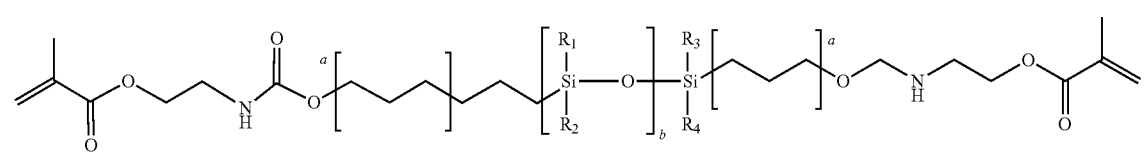

wherein, in Formula 20, $R_1$ to $R_3$ are propyl groups, $R_4$ is a methyl group substituted with hydroxyl, a=3, and b=13.

Comparative Example 1

The compound represented by Formula 13 was used so that the amount of the silicon-containing macromer became 100 parts by weight, and 114 parts by weight of NVP as a hydrophilic monomer, 6 parts by weight of polyethylene glycol (weight average molecular weight of 200 Da), 4 parts by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

Comparative Example 2

The compound represented by Formula 12 and the compound represented by Formula 13 were mixed in amounts shown in Table 2 below so that the amount of the silicon-containing macromer became 100 parts by weight, and 212 parts by weight of NVP as a hydrophilic monomer, 10 parts by weight of polyethylene glycol (weight average molecular weight of 400 Da), 7 parts by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

Comparative Example 3

The compound represented by Formula 11 was used so that the amount of the silicon-containing macromer became 100 parts by weight, and 212 parts by weight of NVP as a hydrophilic monomer, 10 parts by weight of polyethylene glycol (weight average molecular weight of 400 Da), 7 parts by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

Comparative Example 4

The compound represented by Formula 12 was used so that the amount of the silicon-containing macromer became 100 parts by weight, and 45 parts by weight of NVP as a hydrophilic monomer, 44 parts by weight of polyethylene glycol (weight average molecular weight of 1000 Da), 1 part by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

Comparative Example 5

The compound represented by Formula 17 was used so that the amount of the silicon-containing macromer became 100 parts by weight, and 45 parts by weight of NVP as a hydrophilic monomer, 44 parts by weight of polyethylene glycol (weight average molecular weight of 1000 Da), 1 part by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

Comparative Example 6

The compound represented by Formula 14 and the compound represented by Formula 19 were mixed in amounts shown in Table 2 below so that the amount of the silicon-containing macromer became 100 parts by weight, and 45 parts by weight of NVP as a hydrophilic monomer, 44 parts by weight of polyethylene glycol (weight average molecular weight of 1000 Da), 1 part by weight of TEGDMA as a crosslinking agent, SiGMA as a silicon-containing monomer, and AIBN as a thermal initiator were mixed, thereby completing the preparation of a composition for forming a silicone hydrogel contact lens. Subsequently, a silicone hydrogel contact lens was manufactured in the same manner as in Example 1.

Formulations of the compositions for forming a silicone hydrogel contact lens, prepared according to Examples 1 to 13 and Comparative Examples 1 to 6 are shown in Tables 1 and 2 below.

TABLE 1

| Classification | Material name | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Silicon-containing macromer | Formula 11 | 100 | 38 | | 97 | | | | 78 | | | | | |
| | Formula 12 | | 62 | | 3 | 3 | | | | | | | | |
| | Formula 13 | | | 100 | | 97 | 100 | | | | | | | |
| | Formula 14 | | | | | | | 100 | | | 25 | 25 | | |
| | Formula 15 | | | | | | | | 22 | | | | 3 | |
| | Formula 16 | | | | | | | | | 75 | | | | |
| | Formula 17 | | | | | | | | | | 75 | | | |
| | Formula 18 | | | | | | | | | | | 97 | 97 | 62 |
| | Formula 19 | | | | | | | | | | | | 3 | |
| | Formula 20 | | | | | | | | | | | | | 38 |
| Poly ethylene glycol | PEG 200 (Mw. 200) | 95 | 83 | 83 | | | | | | | | | | |
| | PEG 400 (Mw. 400) | | | | 6 | 6 | 6 | 28 | 28 | 95 | | | | |
| | PEG 1000 (Mw. 1000) | | | | | | | | | | 83 | 95 | 95 | 95 |
| Hydrophilic monomer | NVP | 162 | 135 | 135 | 114 | 114 | 114 | 87 | 87 | 162 | 135 | 162 | 162 | 162 |
| Silicon-containing monomer | SIGMA | 108 | 90 | 90 | 76 | 76 | 76 | 58 | 58 | 108 | 90 | 108 | 108 | 108 |
| Crosslinking agent | TEGDMA | 5 | 4 | 4 | 4 | 4 | 4 | 3 | 3 | 5 | 4 | 5 | 5 | 5 |
| Initiator | AIBN | 5 | 4 | 4 | 4 | 4 | 4 | 3 | 3 | 5 | 4 | 5 | 5 | 5 |

TABLE 2

| Classification | Material name | Comparative Example 1 | 2 | 3 | 4 | 5 | 6 |
|---|---|---|---|---|---|---|---|
| Silicon-containing macromer | Formula 11 | | | 100 | | | |
| | Formula 12 | | 3 | | 100 | | |
| | Formula 13 | 100 | 97 | | | | |
| | Formula 14 | | | | | | 62 |
| | Formula 15 | | | | | | |
| | Formula 16 | | | | | | |
| | Formula 17 | | | | 100 | | |
| | Formula 18 | | | | | | |
| | Formula 19 | | | | | | 38 |
| | Formula 20 | | | | | | |
| Polyethylene glycol | PEG 200 (Mw. 200) | 6 | | | | | |
| | PEG 400 (Mw. 400) | | 10 | 10 | | | |
| | PEG 1000 (Mw. 1000) | | | | 44 | 44 | 44 |
| Hydrophilic monomer | NVP | 114 | 212 | 212 | 45 | 45 | 45 |
| Silicon-containing monomer | SIGMA | 76 | 141 | 141 | 30 | 30 | 30 |
| Crosslinking agent | TEGDMA | 4 | 7 | 7 | 1 | 1 | 1 |
| Initiator | AIBN | 4 | 7 | 7 | 1 | 1 | 1 |

Evaluation Example 1

Dispersion force ($\delta D$), dipolar attraction ($\delta P$), and hydrogen bonding force ($\delta H$), which determine Hansen solubility parameters, of the silicon-containing macromer and the polyethylene glycol in each of the compositions of Examples 1 to 13 and Comparative Examples 1 to 6 were calculated using a Y-BM Group Contribution method, and the differences $\Delta\delta D$, $\Delta\delta P$, and $\Delta\delta H$ therebetween were evaluated and shown in Table 3 below.

TABLE 3

| Classification | No | Component | Dispersion force ($\delta D$) | Dipolar attraction ($\delta P$) | Hydrogen bonding force ($\delta H$) |
|---|---|---|---|---|---|
| Example | 1 | Silicon-containing macromer compound | 15.5 | 7.1 | 6.1 |
| | | Polyethylene glycol | 16.4 | 9.4 | 15.3 |
| | | Differences ($\Delta\delta D$, $\Delta\delta P$, $\Delta\delta H$) | 0.72 | 1.84 | 7.36 |
| | 2 | Silicon-containing macromer compound | 15.4 | 7 | 6 |
| | | Polyethylene glycol | 16.4 | 9.4 | 15.3 |
| | | Differences ($\Delta\delta D$, $\Delta\delta P$, $\Delta\delta H$) | 0.800 | 1.920 | 7.440 |
| | 3 | Silicon-containing macromer compound | 15.7 | 6.4 | 5.5 |
| | | Polyethylene glycol | 16.4 | 9.4 | 15.3 |
| | | Differences ($\Delta\delta D$, $\Delta\delta P$, $\Delta\delta H$) | 0.560 | 2.400 | 7.840 |
| | 4 | Silicon-containing macromer compound | 14.8 | 6.6 | 5.7 |
| | | Polyethylene glycol | 14.4 | 9.2 | 11.5 |
| | | Differences ($\Delta\delta D$, $\Delta\delta P$, $\Delta\delta H$) | −0.39 | 2.55 | 5.68 |
| | 5 | Silicon-containing macromer compound | 14.5 | 6.4 | 5.5 |
| | | Polyethylene glycol | 14.4 | 9.2 | 11.5 |
| | | Differences ($\Delta\delta D$, $\Delta\delta P$, $\Delta\delta H$) | −0.098 | 2.744 | 5.880 |
| | 6 | Silicon-containing macromer compound | 15.4 | 5.8 | 5 |
| | | Polyethylene glycol | 14.4 | 9.2 | 11.5 |
| | | Differences ($\Delta\delta D$, $\Delta\delta P$, $\Delta\delta H$) | −0.980 | 3.332 | 6.370 |
| | 7 | Silicon-containing macromer compound | 15.2 | 5.6 | 4.8 |
| | | Polyethylene glycol | 14.4 | 9.2 | 11.5 |
| | | Differences ($\Delta\delta D$, $\Delta\delta P$, $\Delta\delta H$) | −0.900 | 3.060 | 5.850 |
| | 8 | Silicon-containing macromer compound | 15.1 | 5.3 | 4.6 |
| | | Polyethylene glycol | 14.4 | 9.2 | 11.5 |
| | | Differences ($\Delta\delta D$, $\Delta\delta P$, $\Delta\delta H$) | −0.616 | 3.432 | 6.072 |
| | 9 | Silicon-containing macromer compound | 15.9 | 6.6 | 5.7 |
| | | Polyethylene glycol | 14.4 | 9.2 | 11.5 |
| | | Differences ($\Delta\delta D$, $\Delta\delta P$, $\Delta\delta H$) | −1.200 | 2.080 | 4.640 |
| | 10 | Silicon-containing macromer compound | 15.2 | 6.9 | 5.9 |
| | | Polyethylene glycol | 8.9 | 11.2 | 12.4 |
| | | Differences ($\Delta\delta D$, $\Delta\delta P$, $\Delta\delta H$) | −5.544 | 3.444 | 5.292 |
| | 11 | Silicon-containing macromer compound | 14.3 | 6.2 | 5.4 |
| | | Polyethylene glycol | 8.9 | 11.2 | 12.4 |
| | | Differences ($\Delta\delta D$, $\Delta\delta P$, $\Delta\delta H$) | −5.412 | 3.362 | 5.166 |
| | 12 | Silicon-containing macromer compound | 14.1 | 6.1 | 5.2 |
| | | Polyethylene glycol | 8.9 | 11.2 | 12.4 |
| | | Differences ($\Delta\delta D$, $\Delta\delta P$, $\Delta\delta H$) | −5.280 | 3.280 | 5.040 |

TABLE 3-continued

| Classification | No | Component | Dispersion force (δD) | Dipolar attraction (δP) | Hydrogen bonding force (δH) |
|---|---|---|---|---|---|
| | 13 | Silicon-containing macromer compound | 14 | 6 | 5.1 |
| | | Polyethylene glycol | 8.9 | 11.2 | 12.4 |
| | | Differences (ΔδD, ΔδP, ΔδH) | −5.230 | 3.260 | 5.000 |
| Comparative Example | 1 | Silicon-containing macromer compound | 14.8 | 6.6 | 5.7 |
| | | Polyethylene glycol | 16.4 | 9.4 | 15.3 |
| | | Differences (ΔδD, ΔδP, ΔδH) | 1.57 | 2.74 | 9.41 |
| | 2 | Silicon-containing macromer compound | 15.5 | 7.1 | 6.1 |
| | | Polyethylene glycol | 14.8 | 4.9 | 4.3 |
| | | Differences (ΔδD, ΔδP, ΔδH) | −0.294 | 4.410 | 7.252 |
| | 3 | Silicon-containing macromer compound | 15.4 | 7 | 6 |
| | | Polyethylene glycol | 14.7 | 4.7 | 4.1 |
| | | Differences (ΔδD, ΔδP, ΔδH) | −0.392 | 4.214 | 7.056 |
| | 4 | Silicon-containing macromer compound | 14.8 | 4.9 | 4.0 |
| | | Polyethylene glycol | 8.9 | 11.2 | 12.4 |
| | | Differences (ΔδD, ΔδP, ΔδH) | −4.720 | 5.040 | 6.480 |
| | 5 | Silicon-containing macromer compound | 14.7 | 4.8 | 4.1 |
| | | Polyethylene glycol | 8.9 | 11.2 | 12.4 |
| | | Differences (ΔδD, ΔδP, ΔδH) | −4.640 | 5.200 | 6.640 |
| | 6 | Silicon-containing macromer compound | 14.5 | 5.1 | 4.0 |
| | | Polyethylene glycol | 8.9 | 11.2 | 12.4 |
| | | Differences (ΔδD, ΔδP, ΔδH) | −4.880 | 4.880 | 6.400 |

Evaluation Example 2

The physical properties of each of the silicone hydrogel contact lenses manufactured according to Examples 1 to 13 and Comparative Examples 1 to 6 were evaluated using the method described below and are shown in Table 4.

(Evaluation of Strength, Elongation, and Young's Modulus)

A jig for a tensile test is installed at both ends of a specimen that meets the ASTM standard. After installation is completed, a load is applied to the jig at a constant speed, and the mechanical properties of a sample are measured through deformation appearing in the sample. Deformation or fracture occurs according to a force applied depending on the characteristics of each specimen, and these are called tensile strain and tensile stress, respectively. The property of tending to return to its original shape when a load is removed after deformation occurs when the load is applied is referred to as elasticity. The slope on the elastic region can be expressed as Young's modulus. Elongation is defined as $\varepsilon=\Delta L/L0$ as the ratio of a change $\Delta L$ (a change in the length of a specimen with respect to the applied force) to the original mark length L0 of the specimen (the initial specimen length before a force is applied to the specimen), and is generally expressed as a percentage.

(Water Content)

The water content of each lens is measured using a gravimetric method. Moisture is removed from the surface of the lens to measure the weight. The weight is measured after drying at 100° C. to 110° C. (60° C.±5° C. if the lens material is modified) until there is no change in weight. 100 mg to 300 mg of lenses are used, and the weight is measured in units of 0.1 mg. The water content ($W_{H2O}$) is calculated as a percentage using the following expression.

$$W_{H_2O} = \frac{m1 \times m2}{m1} \times 100$$

(m1: weight of lens before drying, m2: weight of lens after drying)

(Oxygen Permeability)

The oxygen permeability (Dk) of a lens is expressed by the diffusion coefficient (D), which is the ability to pass through a material, and the dissolution coefficient (k), which indicates the degree of dissolution of oxygen in the material. In the present invention, the oxygen permeability was measured using a polarographic method in accordance with ISO 18369.

TABLE 4

| Classification | No | Strength [kgf/mm²] | Elongation [%] | Young's modulus | Oxygen permeability (DK) 10⁻¹¹ (cm²/s) [mL O²/ (mL · mmHg)] | Water content (%) |
|---|---|---|---|---|---|---|
| Example | 1 | 6.2 | 171.1 | 0.51 | 82 | 58 |
| | 2 | 6.0 | 170.5 | 0.35 | 88 | 59.5 |
| | 3 | 6.6 | 168.5 | 0.55 | 85 | 55.1 |
| | 4 | 5.75 | 163.0 | 0.37 | 93 | 57.3 |
| | 5 | 6.90 | 165.9 | 0.60 | 85 | 55.3 |
| | 6 | 6.80 | 185.1 | 0.40 | 95 | 53.2 |
| | 7 | 7.90 | 150.9 | 0.75 | 85 | 50.3 |
| | 8 | 6.22 | 175.1 | 0.40 | 100 | 54.5 |
| | 9 | 7.95 | 150.2 | 0.78 | 90 | 51.1 |
| | 10 | 5.50 | 162.6 | 0.50 | 112 | 50.1 |
| | 11 | 6.08 | 178.9 | 0.65 | 90 | 51.6 |
| | 12 | 7.82 | 172.3 | 0.68 | 93 | 52.3 |
| | 13 | 7.71 | 167.1 | 0.49 | 102 | 50.1 |
| Comparative example | 1 | 5.0 | 100.6 | 0.6 | 75.0 | 40.2 |
| | 2 | 4.10 | 110.5 | 0.4 | 85.0 | 45.0 |
| | 3 | 5.21 | 90.0 | 1.1 | 60 | 62.1 |
| | 4 | 3.90 | 95.1 | 0.6 | 72.1 | 63.2 |
| | 5 | 5.90 | 97.7 | 0.9 | 63.9 | 59.9 |
| | 6 | 4.00 | 102.3 | 0.6 | 75.9 | 59.9 |

As can be seen from the results shown in Tables 3 and 4, the silicone hydrogel contact lenses of Examples 1 to 13 satisfying all conditions for determining Hansen solubility parameters were confirmed to have an oxygen permeability (Dk) of 80 to 120 and achieve a water content of 50% to 60%, which means that all predetermined standards are all achieved. It was also confirmed that the silicone hydrogel contact lenses of Examples 1 to 13 exhibited excellent durability evaluation results for strength, elongation, and Young's modulus.

As is apparent from the foregoing description, a silicone hydrogel contact lens in accordance with the present disclosure exhibits higher oxygen permeability and higher water content when compared to Comparative examples.

In addition to the above-described effect, the specific effects of the present disclosure will be described while describing specific details for carrying out the disclosure.

While the present disclosure has been described with reference to embodiments as described above, the embodiments set forth herein are not intended to limit the present disclosure, and it is obvious that various modifications can be made by one of ordinary skill in the art within the scope of the technical spirit of the present disclosure. In addition, although acting effects according to the configurations of the present disclosure are not explicitly described in the foregoing detailed description of embodiments, it is apparent that predictable effects of the corresponding configurations should also be acknowledged.

What is claimed is:

1. A method of preparing a polymer composition, the method comprising:
polymerizing a composition for forming a silicone hydrogel contact lens comprising about 10 to about 40 weight % of a silicon-containing macromer, about 1 to about 20 weight % of polyethylene glycol having a molecular weight of about 200 to about 1,000 g/mol, and a crosslinking agent or an initiator,
wherein the polymerization is carried out by thermal polymerization at a temperature of about 100° C. to about 110° C. or UV photopolymerization in a manner that at least about 95% of polyethylene glycol is removed from the polymer composition.

2. The method of claim 1, wherein polyethylene glycol is PEG 200, PEG 400, or PEG 1000.

3. The method of claim 1, wherein the silicone hydrogel contact lens has a water content of about 40% to about 65% and an oxygen permeability (Dk) of about 70 to about 120.

4. The method of claim 1, wherein the composition for forming a silicone hydrogel contact lens comprises:
about 10 to about 40 weight % of the silicon-containing macromer,
about 1 to about 20 weight % of the polyethylene glycol,
about 10 to about 50 weight % of a hydrophilic monomer,
about 10 to about 20 weight % of a silicon-containing monomer, and
a crosslinking agent or an initiator.

5. The method of claim 1, wherein dispersion force ($\delta D$), dipolar attraction ($\delta P$), and hydrogen bonding force ($\delta H$) of the silicone hydrogel contact lens satisfy the following conditions:

$-6.0 \text{ MPa}^{1/2} \leq \Delta\delta D \leq 1.0 \text{ MPa}^{1/2}$;

$1.5 \text{ MPa}^{1/2} \leq \Delta\delta P \leq 3.5 \text{ MPa}^{1/2}$; and $4.0 \text{ MPa}^{1/2} \leq \Delta\delta H \leq 8.0 \text{ MPa}^{1/2}$.

6. The method of claim 1, wherein the silicone hydrogel contact lens has a tensile strength of about 6 kgf/mm$^2$ to about 8 kgf/mm$^2$, an elongation of about 150% to about 200%, a tensile modulus of about 0.3 kgf/mm$^2$ to about 0.8 kgf/mm$^2$, and/or an oxygen permeability of about $80 \times 10^{-11}$ (cm$^2$/s) [ml O$_2$/(ml·mmHg)] to about $115 \times 10^{-11}$ (cm$^2$/s) [ml O$_2$/(ml·mmHg)].

7. The method of claim 1, wherein the silicon-containing macromer comprises a siloxane chain and has one or two acrylic functional groups.

8. The method of claim 1, wherein the silicon-containing macromer has a weight average molecular weight of about 500 Da to about 2,500 Da.

9. The method of claim 1, wherein the composition for forming a silicone hydrogel contact lens comprises about 21 wt % to about 48 wt % of the silicon-containing macromer.

10. The method of claim 1, wherein the composition for forming a silicone hydrogel contact lens further comprises a hydrophilic monomer.

11. The method of claim 10, wherein the hydrophilic monomer comprises at least one selected from N,N-dimethylacrylamide, 2-hydroxyethyl methacrylate, glycerol monomethacrylate, 2-hydroxyethyl methacrylamide, polyethylene glycol monomethacrylate, methacrylic acid, acrylic acid, N-vinyl pyrrolidone, N-vinyl-N-methyl acetamide, N-vinyl-N-ethyl acetamide, N-vinyl-N-ethyl formamide, N-vinyl formamide, and a combination thereof.

12. The method of claim 1, wherein the composition for forming a silicone hydrogel contact lens comprises about 20 parts by weight to about 239 parts by weight of the hydrophilic monomer with respect to 100 parts by weight of the silicon-containing macromer.

13. The method of claim 1, wherein the composition for forming a silicone hydrogel contact lens further comprises a silicon-containing monomer.

14. The method of claim 13, wherein the silicon-containing monomer comprises at least one selected from α,ω-bismethacryloxypropylpolydimethylsiloxane (SiGMA), 3-methacryloxypropyl tris (trimethylsiloxy) silane (TRIS), monomethacryloxypropyl terminated polydimethylsiloxane, polydimethylsiloxane, 3-methacryloxypropyl bis (trimethylsiloxy) methylsilane, methacryloxypropyl pentamethyl disiloxane, and a combination thereof.

15. The method of claim 1, wherein the crosslinking agent comprises at least one selected from allyl methacrylate (AMA), divinylbenzene (DVB), triethylene glycol dimethacrylate (TrEGDMA), triallyl isocyanurate (TAIC), ethylene glycol dimethyl acrylate (EGDMA), ethylenediamine dimethacrylamide, glycerol dimethacrylate, and a combination thereof.

16. The method of claim 1, wherein the initiator comprises at least one selected from lauryl peroxide, benzoyl peroxide, isopropyl percarbonate, azobisisobutyronitrile, aromatic alpha-hydroxy ketone, alkoxyoxybenzoin, acetophenone, tert-butyl peroxineadecanoate, acyl phosphine oxide, tertiary amine, diketone, 1-hydroxycyclohexyl phenyl ketone, 2-hydroxy-2-methyl-1-phenyl-propane-1-one, bis (2,6-dimethoxybenzoyl) -2,4,4-trimethylpentyl phosphine oxide (DMBAPO), bis (2,4,6-trimethylbenzoyl) -phenylphosphine oxide, 2,4,6-trimethylbenzyldiphenyl phosphine oxide, 2,4,6-trimethylbenzoyl diphenylphosphine oxide, benzoin methyl ester, camphorquinone, ethyl 4-(N, N-dimethylamino) benzoate, Irgacure 819, Irgacure 1700, Irgacure 1800, Irgacure 819, Irgacure 1850, Lucirin TPO initiator, and a combination thereof.

17. The method of claim 1, wherein the composition for forming a silicone hydrogel contact lens further comprises at least one selected from a UV blocker, a pigment, a diluent, and a combination thereof.

18. The method of claim 1, which satisfies the following conditions:

$-0.8 \text{ MPa}^{1/2} \leq \Delta\delta D \leq 0.3 \text{ MPa}^{1/2}$;

$2.0 \text{ MPa}^{1/2} \leq \Delta\delta P \leq 2.5 \text{ MPa}^{1/2}$; and $4.5 \text{ MPa}^{1/2} \leq \Delta\delta H \leq 5.7 \text{ MPa}^{1/2}$.

* * * * *